United States Patent

[11] 3,612,679

[72] Inventors Frazer D. Punnett
Rochester;
Bion W. McClellen, Pittsford, both of N.Y.
[21] Appl. No. 821,256
[22] Filed May 2, 1969
[45] Patented Oct. 12, 1971
[73] Assignee Xerox Corporation
Rochester, N.Y.

[54] SCANNING APPARATUS
4 Claims, 2 Drawing Figs.
[52] U.S. Cl. .................................................... 355/8,
355/47
[51] Int. Cl. .................................................. G03g 15/04
[50] Field of Search ........................................ 355/8, 47

[56] References Cited
UNITED STATES PATENTS
3,062,094  11/1962  Mayo .......................... 355/47
FOREIGN PATENTS
1,079,231  8/1967  Great Britain ................ 355/8

Primary Examiner—Samuel S. Matthews
Assistant Examiner—Edna Marie Bero
Attorneys—Norman E. Schrader, James J. Ralabate, Ronald Zibelli, Donald F. Daley and Clarence A. Green ABSTRACT: A scanning device is herein disclosed for focusing a flowing light image of a stationary original upon a moving image-retaining member. The scanning components involved are positively driven through a single drive means and the motion imparted thereto synchronized with the moving image-retaining member by a control means.

INVENTORS
FRAZER D. PUNNETT
BION W. McCLELLAN
BY
ATTORNEY

SCANNING APPARATUS

This invention relates to a scanning apparatus and, in particular, to an apparatus to synchronously move the illuminating means and lens during scanning.

Scanning devices such as those used in photocopying machines form a light image of the document being copied by successively illuminating incremental portions of the document. The light image formed by the scanning apparatus is usually projected through a lens and focused into a light-receiving member which is then used to make a visible copy of the document.

The operating cycle of such scanning devices normally consists of two phases, a scanning phase and a restoring phase. During the scanning phase the illuminating means moves across the document being copied from a home position to an end-of-scan position to illuminate the document increment by increment thereby forming a light image of the information on the document. After the portion of the document to be copied is completely scanned, the scanning phase is completed and the illuminating means is then restored from its end-of-scan position back to its home position during the restoring phase thereby preparing the apparatus for its next operating cycle.

Prior art scanning mechanisms have suffered under the limitations of being complex, bulky and not completely reliable. A typical mechanism, for example, is one in which the lamp carriage is supported for translation parallel to the document being copied in a plane immediately adjacent the document and a cooperating lens carriage is supported for translation in synchronism with the lamp carriage between the light-receiving member and the lamp carriage. The movement of the lamp carriage and lens carriage is controlled by independent drives systems such as pulley and cable systems. The linear motion of the wire cables pulls the lamp and lens carriages along their respective tracks at corresponding rates of speed to achieve synchronism between the two. In this type of scanning mechanism the synchronous movement of the two carriages is dependent on the precision and reliability and interrelationship of their control systems.

This type of scanning system is bulky and expensive since it requires a multitude of mechanical parts, and unreliable because the timing arrangement between the lamp and lens carriages can become maladjusted after repeated operation thereby throwing the entire scanning system out of synchronism and rendering it useless. In addition, cable breakage and cable stretching can impair the reliability and the accuracy of the synchronous scanning movement. It has also been found that such mechanisms are subject to malfunction due to dust and other foreign matter collecting on the various mechanical parts such as on pulley surfaces and cables.

The invention disclosed herein is a scanning apparatus which has very few moving parts and which maintains more positive control over the synchronism between the illuminating means and lens during the operating cycle than has been previously known in prior art devices. Because of the few moving parts in the invention, the present apparatus is easier and less expensive to manufacture, more compact, and operates more smoothly than the prior art devices.

The scanning apparatus disclosed herein includes an illuminating means and cooperating lens which move parallel to the original document under the control of a single driving arm. The connecting linkage between the illuminating means, lens and the driving arm is a simple pin and slideway mechanism which gives the arm positive control over the movement of the illuminating means during the scanning and restoring movements of the apparatus.

Accordingly, it is an object of the present invention to improve scanning apparatus used to form a light image of an object by illuminating successive increments of the object.

It is another object of the invention to improve scanning apparatus by maintaining accurate control over the movement of the illuminating means and lens during the scanning and restoring phases.

It is another object of the invention to improve the reliability and accuracy of the scanning phase of the cycle by providing a scanning apparatus having a small number of moving parts.

It is still another object of the invention to improve scanning apparatus by employing a single driving arm to control the movement of the illuminating means and lens.

It is still another object of the invention to improve scanning apparatus by providing a compact drive means for synchronously moving the illuminating means and lens during the scanning cycle.

It is another object of the invention to improve the scanning apparatus by employing a single drive system for both the illuminating means and lens which drives the system smoothly and accurately.

SUMMARY OF THE INVENTION

These and other objects of the invention are attained by employing a rotatable arm to drive the illuminating means and lens assemblies of the scanning apparatus during the scanning and restoring phases of the operating cycle of the apparatus. The illuminating means and lens assemblies travel on respective tracks which guide their motions in a plane parallel to the object being scanned. Motion is imparted to these assemblies by the arm through connecting pins which are affixed to the arm and ride in sideways in the illuminating means and lens assemblies. The slideways are shaped to accommodate the varying positions of each connecting pin relative to the plane in which the illuminating means and lens assemblies move since the assemblies travel in a linear path while the arm and connecting pins rotate in an arc while scanning is taking place. The arm, which is driven by a cam connected to the main drive shaft of the machine, drives the illuminating means and lens assemblies across a platen supporting an object such as a document. When adapted to a photocopying system, the scanning phase of the operating cycle can be carried out at speeds which synchronize the light image formed by the apparatus with the movement of the light-receiving surface upon which the light image is projected.

BRIEF DESCRIPTION OF THE DRAWINGS

For a better understanding of the invention as well as other objects and further features thereof, reference is had to the following detailed description of the invention to be read in connection with the accompanying drawings, wherein.

DESCRIPTION OF THE PREFERRED EMBODIMENT

The present invention is a scanning apparatus used to form a light image of an object such as a document by scanning the document in continuous successive increments. Although the scanning apparatus has many applications, it will be described within the environment of a reproduction system in which an original document is scanned and the light image resulting therefrom is projected onto an electrostatic plate where a copy of the original document is formed.

Figure 1:
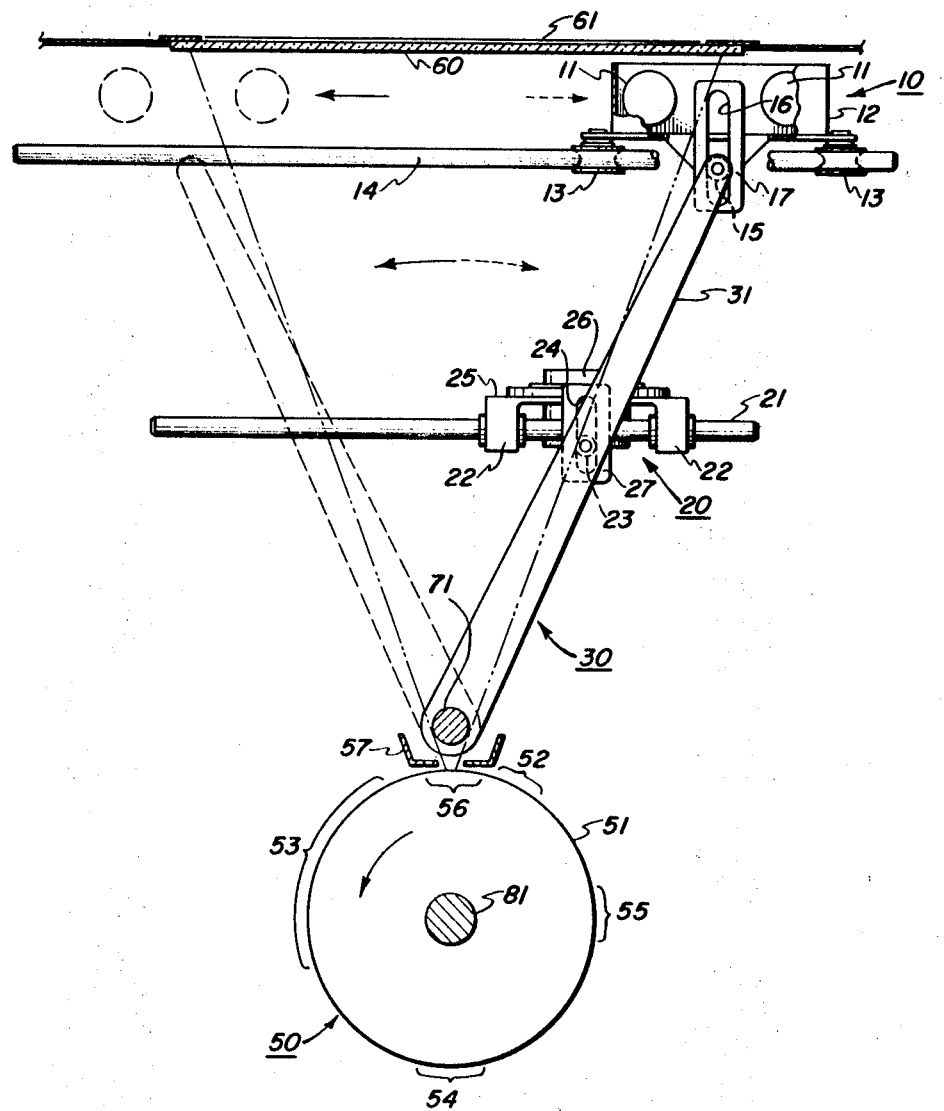
FIG. 1 is a schematic side view of the invention.

Referring to FIG. 1, a reproduction system employing an electrostatic plate is shown in combination with the present invention. The reproduction apparatus can be any suitable type to which the present invention can be adapted such as the xerographic system shown in the figures. The document 61 to be reproduced is positioned on platen 60 and scanned by the scanning apparatus which comprises lamp assembly 10, lens assembly 20, arm 31, and means to drive the arm (shown in FIG. 2 only). The light image formed by the lamp assembly as it scans the document is projected and focused onto a charged electrostatic drum 51 to form a latent electrostatic image on the drum. The latent image is then developed in station 53 and the developed image transferred from the drum to any suitable support material in station 54.

The reproduction apparatus shown is a xerographic system 50 having an electrostatic drum 51 as its light-receiving member. The drum, which includes a photoconductive material on a conductive backing material, is mounted on shaft 81 which, in turn, is journaled in a frame (not shown) to rotate in the direction indicated by the arrow. As the drum rotates its surface passes through processing stations 52, 53, 54, 55, and 56. For the purposes of the present disclosure, the various stations in the path of movement of the drum surface are described functionally only.

Charging station 52 places a uniform electrostatic charge on the photoconductive layer of the electrostatic drum in preparation to the drum surface passing through the exposure station. Exposure station 56 is the area in which a light image formed by the scanning apparatus is projected onto the drum surface. light image dissipates the electrostatic charge in those portions of the drum struck by the light to form a latent electrostatic image of the document 61. The exposure station can include a light shield 56 having an aperture aligned transversely to the direction of rotation of the xerographic drum so that extraneous light cannot reach the drum. The operation of the scanning apparatus is described in more detail below.

At the developing station 53 suitable powder material such as toner is placed in contact with the drum surface to develop the latent image thereon. The toner adheres to the drum surface in the configuration of the latent image thereby developing the latent image. Adjacent the developing station is a transfer station 54 at which the developed image is transferred from the drum surface to a support material. The transfer station can include any suitable feeding mechanism adapted to feed the support material adjacent the drum and in synchronism therewith during the transfer step. Beyond the transfer station is cleaning station 55 which includes a drum-cleaning device adapted to remove any residue toner remaining on the drum after the transfer step has been completed.

The scanning apparatus includes lamp assembly 10, lens assembly 20 and arm 31. The lamp assembly is adapted to travel adjacent transparent platen 60 in order to provide illumination to the document 61 which is supported by the platen. The lamp assembly travels in a path adjacent and substantially parallel to the platen by wheels 13 which are mounted on carriage 12 and which are guided by track 14. Within carriage 12 are lamps 11 which illuminate document 61 to form a light image conforming to the information on the document. Carriage 12 also has a connector plate 17 fixed to it adjacent connecting pin 15. Connector plate 17 has a slideway 16 which enables the movement of the lamp assembly to be controlled by connecting pin 15 on arm 31.

Lens assembly 20 is guided along a plane which is parallel to the plane of travel of the lamp assembly and is controlled by the movement of arm 31 in similar fashion to the lamp assembly. The carriage 25 of the lens assembly carries an appropriate lens system 26 to focus the reflected light image produced by the lamps on the surface of the drum 51 in the exposure station. Carriage 25 is guided along rods 21 by bushings 22. Bushings 22 are adapted to enable the carriage to slide along rods 21 in either direction depending on the direction of movement of arm 31. Like lamp assembly 10, carriage 25 has a connector plate 27 fixed to the carriage adjacent connecting pin 23 which is located on arm 31. Connector plate 27 has a slideway 24 which enables the movement of the lens assembly to be controlled by the movement of connecting pin 23.

Connecting pin 15 travels in slideway 17 and connecting pin 23 travels in slideway 24. The slideways enable the connecting pins to move relative to the carriage and still maintain direct contact control between the connecting pins and lamp and lens carriages. The connecting pin and slideway devices enable the rotary motion of arm 31 to be translated into linear motion to drive the lens and lamp assemblies.

The operation of the scanning apparatus includes a two-phase operating cycle; the first phase is for scanning the document 61 and focusing the resulting light image reflected from the document onto the surface of the drum and the second phase is for restoring the scanning apparatus to its home position in preparation for a subsequent cycle. In FIG 1, arm 31 is shown in solid lines at its home position just prior to the beginning of the first phase of an operating cycle, the scanning phase, and in dotted lines at its end-of-scan position just prior to the beginning of the second phase of the cycle, the restoring phase. During the scanning phase the lens and lamp carriages and arm 31 move from the home position (shown in solid lines) to the end-of-scan position (shown in dotted lines) and a restoring phase during which the same elements move from the end-of-scan position back to the home position. During the scanning phase the lamp carriage travels at a speed relative to the document which places the light image on the drum in synchronism with the surface speed of the drum 51 at the exposure station. During the restoring phase, the lamp carriage can be driven at any suitable speed, but it is preferable to drive it back to the home position as quickly as possible so that little time is wasted between scanning phases.

The lamps 11 on the lamp carriage are turned on at the beginning of the scanning phase by any suitable control circuit (not shown) and can be shut off when the end-of-scan position is reached. However, leaving the lamps on during the entire operating cycle would be preferable especially when several scanning cycles are carried out in quick succession to prevent inordinante fatigue on the lamps due to constantly turning it off and on between cycles. Therefore, in the alternative, the lamps can be left on during the restoring phase of the operating cycle in which case it may be preferable to provide some means to prevent the light generated by the lamps from reaching the drum 51 during the restoring phase such as a shutter (not shown).

In the reproduction system shown in FIG. 1 the electrostatic plate is in the shape of a drum and rotates continuously at a uniform speed during scanning. Therefore, the speed at which the lamp carriage moves across the platen to scan the document must be uniform and must be maintained at a rate which projects the light image of the document onto the drum surface at the same rate of speed as the surface of the drum is traveling. The purpose of lens 26 is to present clear, well-defined, and focused light images to the drum surface and, therefore, the light rays reflected by the document should pass through the lens on their way to the surface of the drum throughout the scanning operation. To effect this, the centerline of the reflected light image should be coincident with the centerline of the lens throughout the scanning phase.

The position of the lens is accurately maintained relative to the position of the lamp carriage in the apparatus disclosed herein throughout the scanning phase since the movement of both carriages is positively controlled by the same arm. In the apparatus shown the movement of the lens carriage is inherently coordinated and synchronized with the movement of the lamp carriage in such a manner that the major part of the light rays reflected from the document will always pass through the lens to be projected and focused onto the drum.

Figure 2:
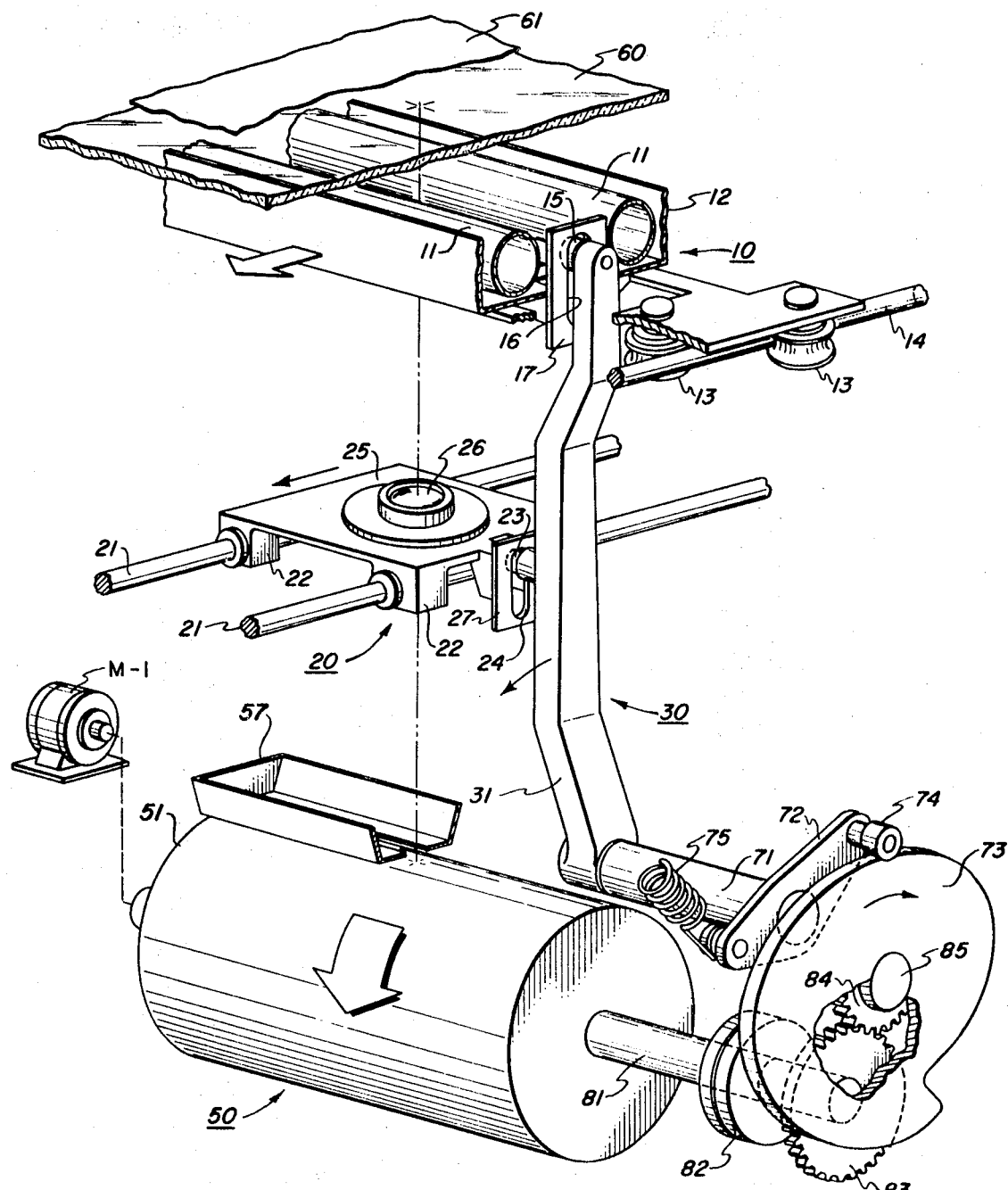
FIG. 2 is an isometric view of the scanning apparatus and its associated drive means.

The mechanism which controls the movement of arm 31 during the operating cycle of the scanning apparatus is shown in FIG. 2. In this figure, arm 31, lens assembly 20, and lamp assembly 10, are positioned at an instantaneous location between the home position and end-of-scan position during the scanning phase. The speed of rotation of arm 31 is regulated by the cam 73. Arm 31 and cam follower arm 72 are mounted on shaft 71 and turn with the shaft. All motion of the cam follower arm is transmitted to arm 31 through shaft 71. Cam follower 74, mounted on the end of the arm 72, follows the periphery of the cam as the cam turns and, as a result, the movement of arm 31 is controlled by the external configuration of cam 73. Drum 51 is secured to and rotates with split shaft 81, the main drive shaft in the machine. One end of shaft 81 contains gear 83 which is in mesh with gear 84. Gear 84 is securely mounted on rotatable shaft 85 and is driven by gear 83. Since cam 73 also turns with shaft 85 the cam is driven by shaft 81 through gears 83 and 84 and shaft 85. Shaft 81 is split by clutch 82 and gear 83 rotates with the shaft only when the clutch is engaged. Clutch 82 is desirable so that the drum 51 can continue to turn even though the scanning apparatus is not in operation, thus allowing the process steps to be carried out on the drum without further scanning being necessary. Shaft 81 can be driven by any suitable drive means such as motor M-1.

The operation of the drive means for the scanning apparatus is now described. Motor M-1 drives shaft 81, drum 51, and clutch 82. As soon as a uniformly charged portion of drum 51 is located in the exposure station (not shown in FIG. 2 for the purpose of simplicity, but indicated by the centerline of the light image which is focused on the drum), the operating cycle of the scanning apparatus can begin. Motor M-1 rotates drum 51 in the direction shown by the arrow. When the scanning phase is begun, any suitable control mechanism (not shown) activates lamps 11 and engages clutch 82 thereby permitting gear 83 to rotate with shaft 81. Motion is imparted to the shaft 85 through gear 84 which meshes with gear 83. Through this gear and clutch arrangement cam 73 turns in the direction shown by the arrow.

The surface configuration of cam 73 is such that at the beginning of the scanning cycle; that is, when arm 31 is in its home position, cam follower 74 begins to rotate in the counterclockwise direction carrying shaft 71 and arm 31 in the counterclockwise direction. Due to this motion arm 31 carries the lamp and lens assemblies across the platen for the scanning phase of the operating cycle. After the platen has been completely scanned; that is, when the first phase is completed and the end-of-scan position is reached by arm 31, the cam, still rotating in the clockwise direction, causes the cam follower 71 to rotate in the clockwise direction and restore arm 31 to its home position by rotating the arm in the clockwise direction. Spring bias 75 is adapted to keep the cam follower 74 in contact with the surface of cam 73 at all times.

The configuration of cam 73 is such that it will turn arm 31 in the counterclockwise direction during the first phase of the operating cycle so that the lamp assembly scans the document at a uniform rate of speed. As mentioned above, the speed of the restoring phase is preferably greater than the scanning speed to reduce the time of the operating cycle to a minimum, and this speed is regulated by the remainder of the cam periphery.

It is intended that appropriate control means be used to control the rotation of the drum, the operations of the various stations about the periphery of the drum, and the activation of the lamp and clutch 82. These control means can be any suitable type which will enable the invention to operate as disclosed herein.

In addition to the apparatus outlined above, many other modifications and additions to this invention will be readily apparent to those skilled in the art upon reading this disclosure, and these are intended to be encompassed within the disclosure and claims of the invention herein.

1. Apparatus for scanning a viewing plane and for focusing a light image of an original stationarily supported therein upon a moving image-retaining member including a lens element arranged to move freely over a path of travel parallel to the viewing plane and to focus light images of an original supported thereon onto the moving image-retaining member, illuminating means interposed between said lens element and the viewing plane being adapted to illuminate an incremental region in said viewing plane, said illuminating means being arranged to move freely along a path of travel parallel to said viewing plane whereby successive incremental regions thereon are illuminated, a moveable arm secured to both said lens element and to said illuminating means being arranged to drive said lens element and said illuminating means along their respective paths of travel through a scanning path whereby each successive region illuminated in said viewing plane is focused by the lens on the moving image-retaining member, control means operatively associated with said connecting means and the moving image-retaining element to synchronize the motion of the lens and the illuminating means with that of the moving image-retaining member whereby successive incremental regions of illumination in the viewing plane are focused upon the moving image-retaining member in a nondistorted manner.

2. The apparatus of claim 1 wherein said movable arm is pivotally retained at one end about the imaging plane and having slidably connected to the arm therein said lens element and said illuminating means.

3. The apparatus of claim 2 wherein said control means comprises a cam member having a working profile in operative communication with said arm and being arranged to translate a motion to said arm whereby said lens and said illumination means are scanned across said viewing plane at a constant velocity.

4. The apparatus of claim 3 wherein said cam is further arranged to restore said lens element and said illuminating means to a start of scan position after completion of the scanning pass at a velocity greater than the scanning velocity.